UNITED STATES PATENT OFFICE.

GUY M. GARLICK, OF KALAMAZOO, MICHIGAN, ASSIGNOR TO WILLIAM S. MITCHELL, OF GARY, INDIANA.

WATERPROOFING COMPOSITION.

1,315,110.  Specification of Letters Patent.  Patented Sept. 2, 1919.

No Drawing.  Application filed March 5, 1918.  Serial No. 220,510.

*To all whom it may concern:*

Be it known that I, GUY M. GARLICK, a citizen of the United States, residing at Kalamazoo, in the county of Kalamazoo and State of Michigan, have invented new and useful Improvements in Waterproofing Composition, of which the following is a specification.

My present invention relates to a novel and improved waterproofing composition which is applicable generally to porous substances or materials of various kinds, and especially to textile or other fabrics, the composition being easily and inexpensively manufactured, capable of being applied easily, and, when applied, it is effective, durable, and permanent.

The composition comprises, primarily, a wax or waxy substance, rubber, a resin or resinous substance, solvents for the wax, rubber and resinous substance that will cause homogeneous union thereof, and a penetrating agent, preferably carbon bisulfid.

The constituents generally preferred and their proportions are as follows:

Refined paraffin wax_____ 12–24 oz.
Rubber in liquid form or rubber cement_____ 15–30 oz.
Resin, resin oil or gum mastic___ 2–6 oz.
A solution of resin and alcohol, resin oil and alcohol, or gum mastic and alcohol in the proportion of three parts alcohol to one part of resin, resin oil or mastic_____ 25–50 oz.
Light hydrocarbon oil, such as gasolene, benzene, naphtha or kerosene _____ 80–165 oz.
Carbon bisulfid_____ 6–12 oz.

The preferred method of preparing the composition to form a saturated solution is as follows:

The paraffin and dry resin, resin oil or gum mastic are placed in a vessel and heated until the mass is in a liquid form. The rubber in liquid form or the rubber cement is then added and the temperature of the mass is raised to from 250° F. to 350° F., a temperature of about 305° being generally preferable. During this operation, the liquid is agitated or stirred. It will be found, when the proper temperature is reached, that the paraffin, resin and rubber coalesce or combine to form an apparently homogeneous mass.

The temperature of the liquid is then reduced to at least 140° F. and the solution of alcohol and resin oil or alcohol and gum mastic is then added to the mixture together with from six to twelve ounces of the light hydrocarbon oil, such as gasolene, benzene, naphtha or kerosene. During this operation, the mass is agitated. Heat is then applied and its temperature is brought to from 150° F. to 250° F., a temperature of 180° F. being generally preferred, the mass being agitated during this operation. While the mass is at a temperature of from 100° F. to 180° F. (a temperature of 140° F. being generally preferred) 80 to 150 ounces of the light hydrocarbon oil, such as gasolene, benzene, naphtha or kerosene, are then added, the mixture being slowly agitated, after which the temperature of the mass is permitted to drop to from 60° F. to 80° F. and then six to twelve ounces of carbon bisulfid are added. After straining and settling off, the composition is ready for use.

The composition, according to the present invention, is in liquid form and is capable of being readily applied to the substances or articles to be treated therewith by brushing, immersion or other suitable means. The consistency of the preparation of the composition can be varied as desired by increasing or diminishing the proportions of the wax, rubber and resinous substances. By using larger proportions of wax, rubber and resinous substance, the consistency of the preparation is increased, and by diminishing the proportions of these constituents the consistency of the preparation is reduced. Intermediate consistencies may be obtained by using proportions intermediate of the ranges above specified.

It is preferable generally to use paraffin as a wax constituent, but other waxes or waxy substances not containing oil, such for example as bees-wax, may be used. The rubber in liquid form or rubber cement comprises preferably rubber dissolved in gasolene or other rubber solvent.

A composition prepared in accordance with the present invention may be used generally for waterproofing, preserving, or protecting from corrosion materials and articles of various kinds. The solvents or volatile constituents evaporate shortly after application of the composition, leaving the composition in a permanent condition, and when the composition is applied to textile fabrics, the composition penetrates or impregnates the fibers composing the threads of the fabric, rendering the fabric waterproof or capable of shedding water, the fabric or other substance is non-absorbent to water, and, in applying the composition to fabrics, the same may be rolled or folded with equal ease as untreated fabric and yet will not be subject to cracking. Furthermore, the composition enables fabrics to be waterproofed and preserved without adding appreciably to the weight of the fabrics.

I claim as my invention:

1. A waterproofing composition comprising a mixture consisting of a wax, dissolved rubber, and a resinous substance homogeneously united by heat.

2. A waterproofing composition comprising a mixture consisting of a wax, dissolved rubber, and a resinous substance united homogeneously by heat, and a penetrative agent.

3. A waterproofing liquid comprising a mixture consisting of a wax, dissolved rubber and a resinous substance homogeneously united by heat, and a hydrocarbon diluent.

4. A waterproofing liquid comprising a mixture consisting of a wax, dissolved rubber and a resinous substance homogeneously united by heat, a dissolved resinous substance, and a light hydrocarbon oil.

5. A waterproofing liquid composed of a mixture consisting of a wax, dissolved rubber and a resinous substance united homogeneously by heat, a resinous substance dissolved in alcohol, a hydrocarbon diluent, and a penetrative agent.

6. A waterproofing composition consisting of paraffin wax, dissolved rubber, a resinous substance dissolved in alcohol, a light hydrocarbon oil, and a penetrative agent.

7. A waterproofing composition consisting of paraffin wax, dissolved rubber, a resinous substance dissolved in alcohol, a light hydrocarbon oil, and carbon bisulfid.

In testimony whereof I have hereunto set my hand in presence of two subscribing witnesses.

GUY M. GARLICK.

Witnesses:
C. A. BATEMAN,
CHAS. S. HYER.